Patented Nov. 21, 1950

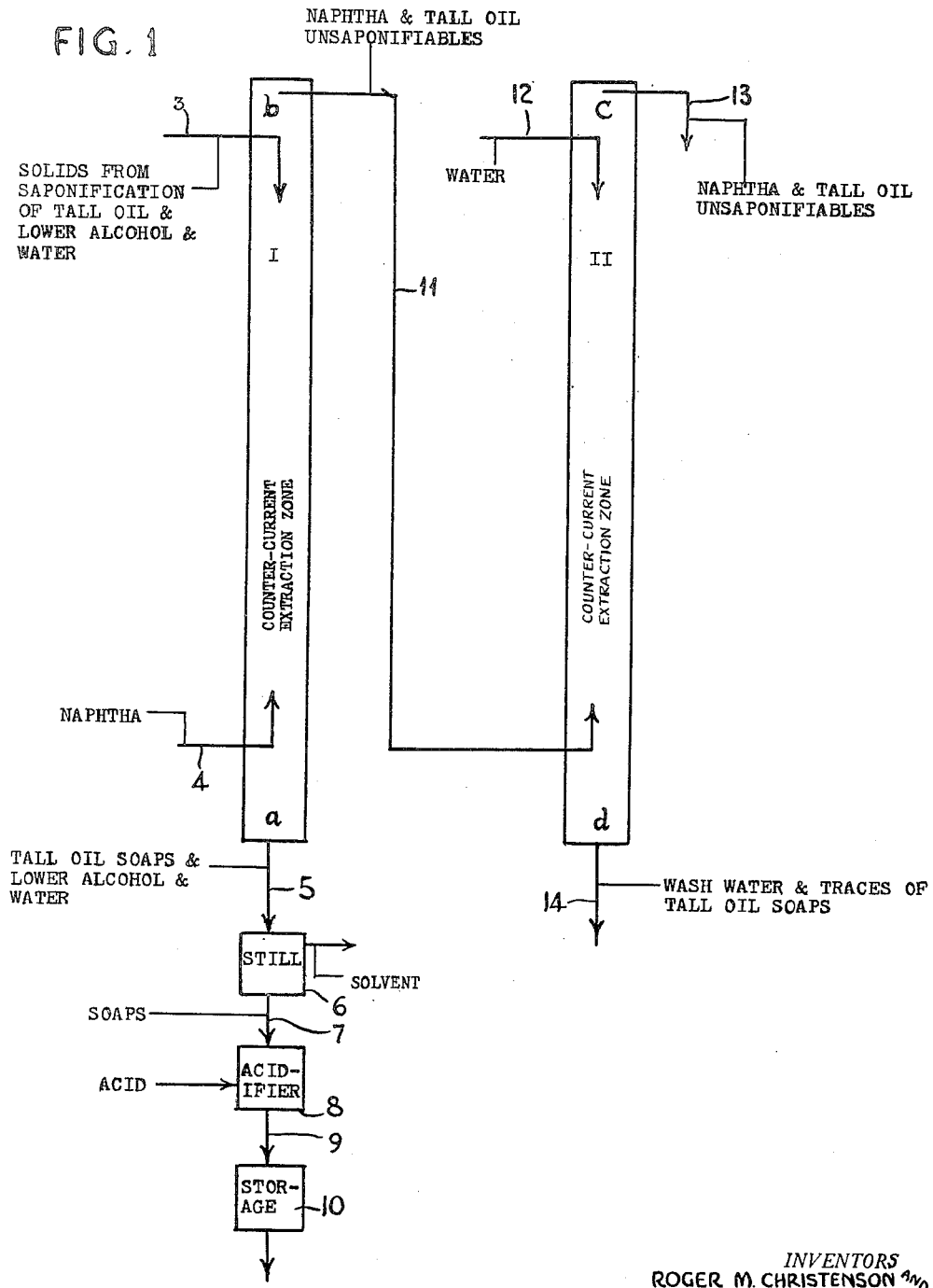

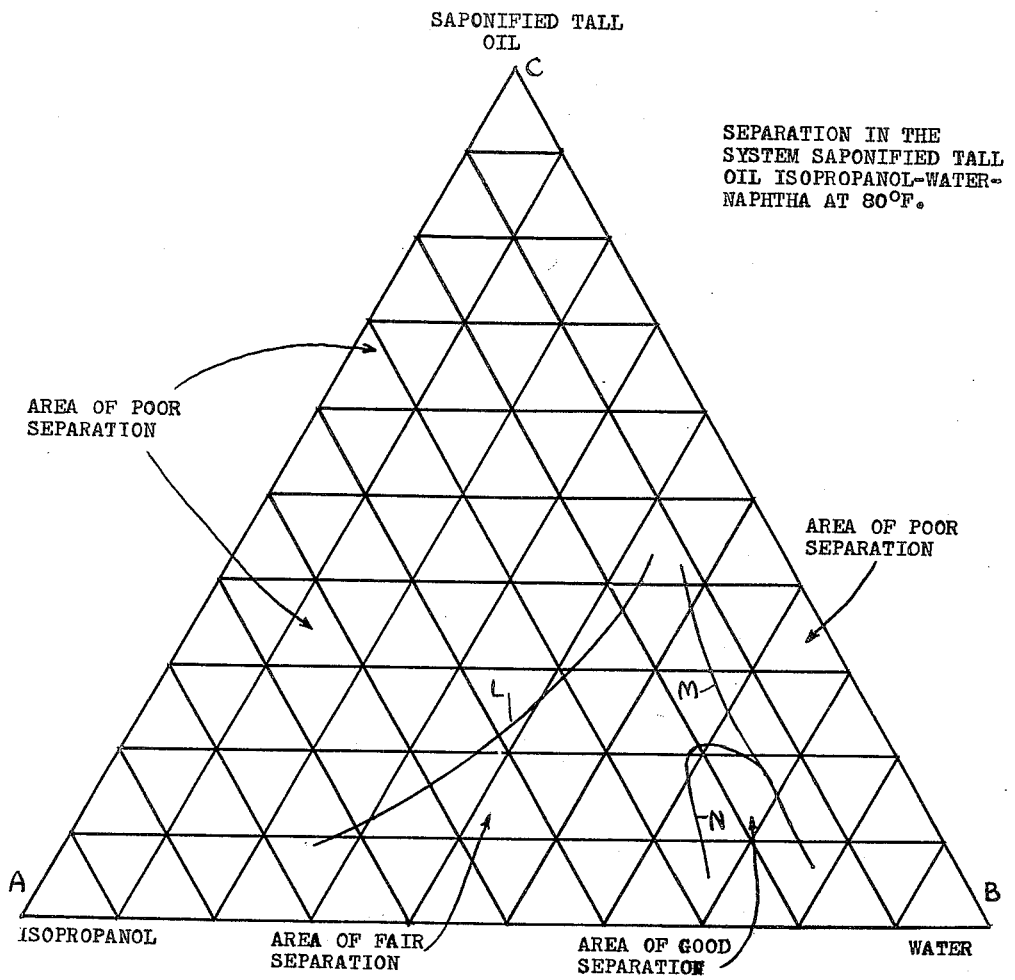

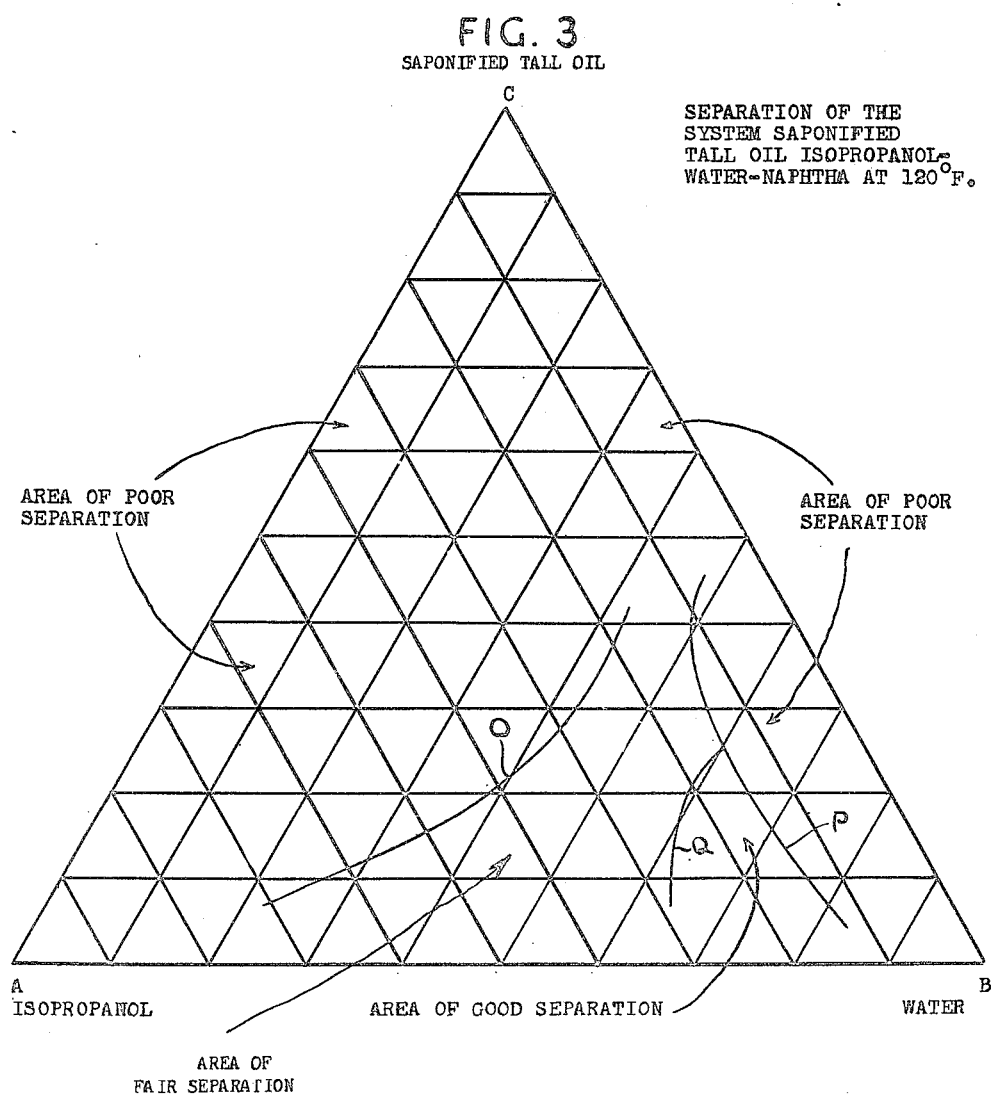

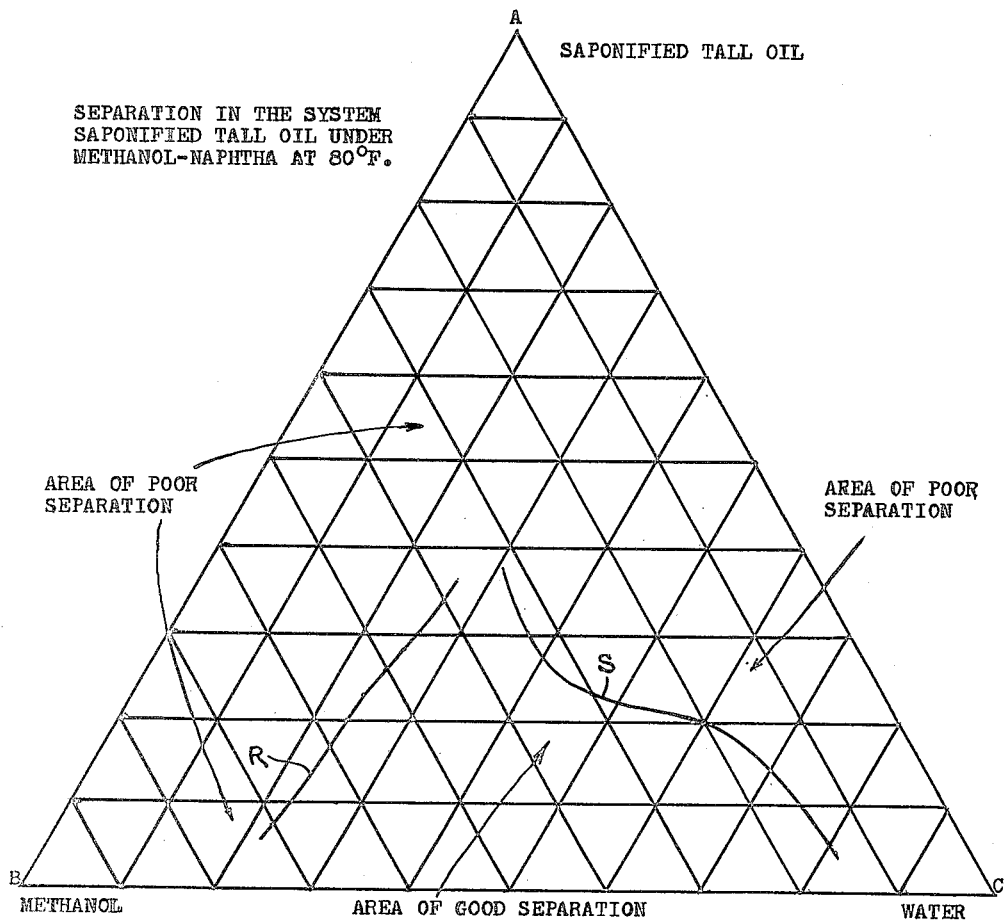

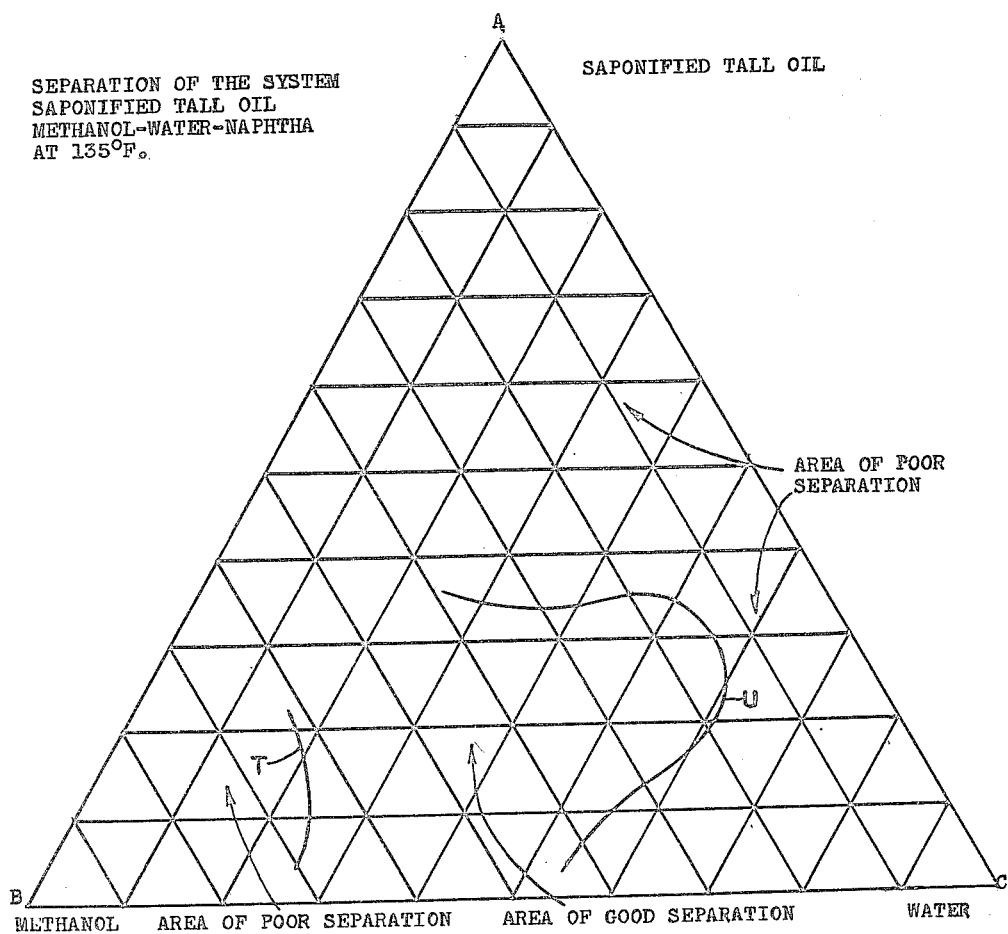

2,530,809

UNITED STATES PATENT OFFICE 2,530,809

FRACTIONATION OF TALL OIL

Roger M. Christenson and Stewart W. Gloyer, Milwaukee, Wis., assignors to Pittsburgh Plate Glass Company Application August 23, 1949, Serial No. 111,804

6 Claims. (Cl. 260—97.7)

The present invention relates to the treatment of the residues or by-products from the manufacture of paper pulp and it has particular relation to the treatment of the residues or by-products known as tall oil soaps obtained in the waste liquors from the digestion of pine wood in order chemically to convert it into paper pulp.

One object of the invention is to recover sterols from the by-products above indicated in a form suitable for use in the preparation of sex hormones, wetting agents and other valuable products.

A second object is to increase the yield of valuable distilled fatty acids and rosin acids recoverable from tall oil or tall oil soaps.

A third object is to provide rosin acids and and fatty acids having improved drying characteristics when incorporated into paint compositions.

A fourth object is to provide a process of obtaining the sterols and other useful components of tall oil in which the unsaponfiable matter containing the sterols is extracted directly by counter-current methods from the crude paste of soaps of tall oil acids and unsaponifiable matter as obtained in the paper industry.

These and other objects of the invention will be apparent from consideration of the following specification and the appended drawings.

In the drawings, Figure, 1 diagrammatically illustrates an embodiment of apparatus suitable for use in the practice of the invention.

Figure 2 is a graph showing by triangular coordinates the approximate limits at a lower temperature of the operable systems of tall oil solids, water and isopropyl alcohol.

Figure 3 is a similar curve for a higher operating temperature.

Figures 4 and 5 are graphs corresponding respectively to Figures 2 and 3 but applying to the use of methanol as the alcoholic medium.

In the practice of the invention the following steps are employed:

Firstly, the crude by-product or residue from the manufacture of paper pulp known as the soaps of tall oil are admixed with a lower alcohol preferably of the monohydric alkanol type and water to obtain a solution of the tall oil soaps and the unsaponifiable matter associated therewith.

Secondly, the soap solution is subjected to extraction with a solvent which is immiscible in, or but partially miscible with the soap solutions and which is a solvent for the unsaponifiable constituents of the tall oil. Solvents for the unsaponifiable matter appropriate for the purpose include naphthas and other material which will be referred to in greater detail subsequently. The extraction of the soap solution with the solvent for the unsaponifiable matter may be conducted batchwise, but preferably it is conducted counter-currently in a packed column, although an unpacked column of suitable design, or other contacting device could also be employed.

Thirdly, the solution of unsaponifiable material extracted from the soap solutions is washed with water to free it of any traces of soaps of tall oil carried over therein.

Fourthly, the washed solution of unsaponifiable material rich in sterols, coloring matter and any other unsaponifiable constituents is subjected to evaporation and stripping in order to eliminate the solvent.

Fifthly, the crude unsaponifiable material rich in sterols is dissolved in an appropriate solvent such as one of the lower alcohols or acetone and subjected to crystallization in order to obtain the sterols in relatively pure form.

Sixthly, if desired, the soaps of fatty acids and rosin acids in the water-alcohol solution may be recovered in any convenient manner. One such method of recovery would involve precipitation or salting out. Another convenient method would involve evaporation of the alcohol.

The soaps may then be treated with acid such as hydrochloric acid, sulfuric acid or other strong soluble acid designed to liberate the free fatty acids and free rosin acids. The free acids subsequently are washed with water to remove salts and any residual mineral acids contained therein. The mixture of acids may then be distilled under vacuum and obtained in a state of exceptional value for industrial application.

In Figure 1 is diagrammatically shown an embodiment of apparatus adapted for the counter-current fractionation of the tall oil soaps.

The apparatus comprises columns I and II, the first of which is employed for extracting the unsaponifiable matter by means of a solvent relatively immiscible with the soap solutions and the second of which is employed in the operation of washing the solution of unsaponifiable matter in order to remove traces of soaps. In the practice of the invention a solution of the crude by-product termed tall oil soaps, made up preferably in water and a lower alcohol in a manner hereinafter described, is fed in to the column I near the top thereof as indicated at 3 and a solvent of the unsaponifiable matter relatively immiscible with the water and alcohol is fed in near the bottom as indicated at 4.

A naphtha such as a heptane fraction from an aliphatic petroleum hydrocarbon constitutes a good solvent for the unsaponifiable material. It will be appreciated that if the solvent for the unsaponifiable material is of greater density than the soap solutions, it may be fed in at the top of the column I while the soap solutions are fed in at the bottom.

The aqueous alcohol solution of soaps flows as a liquid through the column countercurrently with respect to the solvent for the unsaponifiable matter and is drawn off from clearing zone $a$ at the bottom of the column (assuming the soap solution be of the greater density) as indicated at 5. The feed rate is dependent upon the size of the column, the nature of packing and such like factors, but should not be so great as to cause mechanically entrained solvent of unsaponifiable matter to pass out of the column along with the aqueous alcohol or vice versa. This condition is easily observed. Very slow feeds are objectionable because of unnecessarily low output but otherwise are permissible. The soap solution passes to a still 6 for the removal of solvents contained therein. The mixture of soaps from which the solvents have been evaporated pass through a line 7 to a container 8 where they are acidified in order to regenerate the free acids such as rosin acids and fatty acids. The free rosin and fatty acids pass out from the acidifier through a line 9 to a container 10 which may be employed for purposes of storage pending use or shipment of the material, or further treatment thereof. Such further treatment may, for example, comprise water washing in order to remove salts and other water soluble substances admixed with the free fatty acids and free rosin acids. Subsequently, the acids are distilled preferably under vacuum, e. g. vacuum of the order of 0.5 to 50 millimeters pressure. In this manner acids of high merit in the manufacture of coating composition, paints, and soaps are recovered. Only a small still residue remains after the distillation operation.

The solution of unsaponifiable matter in naphtha or other appropriate solvent immiscible with aqueous alcohol soap solution is drawn off at the top of column I from clearing zone $b$ through line 11.

For purposes of washing the solution to free it of residual soaps, the solution is passed to column II at a point slightly above the bottom. Simultaneously, wash water is fed into the column as indicated at 12 slightly below the top and flows countercurrently through the solution of unsaponifiable matter. The latter solution is drawn off through line 13 at the top of column II. Simultaneously, water containing residual soaps and other water soluble constituents is drawn off as indicated at 14 and may be subjected to further treatment, e. g. to acidification to precipitate free rosin and fatty acids or it may be discharged as waste or dissolved alcohol may be recovered by distillation. Clearing zones $c$ and $d$ are provided respectively at the top and bottom of column II.

The naphtha solution of unsaponifiable matter containing a high percentage of sterols may also be subjected to further treatment. For example, the naphtha may be evaporated. The sterols may then be crystallized out of a solvent such as methyl alcohol, ethyl alcohol, acetone, or other appropriate solvent or solvent mixture and are obtained in a state of exceptional purity in which they are excellently adapted for use in the synthesis of pharmaceuticals, emulsifiers, anti-oxidants, and other products.

It will be appreciated that in the preparation of water-alcohol solutions of the crude soaps and unsaponifiable matter of tall oil, various alcohols may be employed. These include methyl alcohol, ethyl alcohol, normal propyl alcohol, isopropyl alcohol, butyl alcohol, isobutyl alcohol, and other alcohols notably of the alkanol type which are water soluble, at least to a reasonable degree. Methanol, ethanol and isopropyl alcohol are especially suitable. Solutions may be made up to approximately the following composition:

Crude soaps of tall oil, 5 to 35% and preferably 15–30%.
Water soluble alcohol, e. g. isopropyl alcohol, 15–50% (preferably 16–27%).
Water, the rest of the composition.

Any solvents for the unsaponifiable matter in tall oil and which are immiscible with or only partially miscible with the water-alcohol solutions may be employed to extract the unsaponifiable matter. In this group may be included the various alkanes such as the heptanes, or the other petroleum fractions which are not excessively volatile or which are not of such high boiling point as to be difficult to remove from the unsaponifiable matter by evaporation. Ethers, such as diethyl ether, methyl ethyl ether, isopropyl ether, ethyl or methyl isopropyl mixed ethers, aromatic hydrocarbons such as benzene, toluene or xylene, or chlorinated hydrocarbons such as ethylene dichloride, and others may be employed in the separation of the unsaponifiable matter from the soap solutions. It is usually preferred to employ the solvent for unsaponifiable matter in a ratio of about 1 to 1 with respect to the soap solution. However, this ratio may be much higher, for example 15 or 20 parts by volume per part of soap solution. Lower ratios are also contemplated. A good working range for naphtha as the solvent of unsaponifiable matter would be .5 to 10 parts by volume of naphtha per part of soap solution subjected to extraction. Excessive increase of the ratio of solvent for the unsaponifiable material tends to become uneconomical because of the large volumes of solvent which must be handled and the cost of evaporation. The following examples illustrate the practice of the invention:

*Example I*

In this example, isopropyl alcohol was employed with water as the solvent medium. A tall oil soap obtained by evaporating a part of the liquids from the crude product as obtained from the paper making industry and containing about 60 per cent of solids including about 55 per cent of soaps of rosin and fatty acids, was employed. No additional alkali was required. This material was of pasty consistency and contained unsaponifiable matter within a range of 4.8 to 6 per cent of the paste composition.

In order to prepare an extractable solution, 40 parts by weight of the paste containing 24 parts of solids and 16 parts of water were dissolved in 56 parts of water and 64 parts of isopropyl alcohol. This solution was then subjected to countercurrent extraction with a heptane fraction of petroleum hydrocarbon in column I. The soap solution was fed into the column through line 3 and naphtha was fed in as indicated at 4, the feed ratios being 40 parts by volume of the solution of crude tall oil soaps to 80 parts by volume of the heptane fraction. The heptane solution was drawn off at 11 and the solution of soaps in water and isopropyl alcohol was drawn off at 14. The temperature of operation was about 75 to 80° F. but could have been higher or lower. In order to obtain thorough extraction, the soap solution could be passed several times through the same column or could be passed through a succession of columns operated in a series where it could be washed repeatedly with naphtha or other solvent for unsaponifiable matter.

The naphtha extract containing the unsaponifiable material from the crude tall oil soaps was subsequently washed free of soaps and alcohol and other water soluble constituents in column II. The washing operation was conducted as follows:

Feed of naphtha containing unsaponifiable material, 80 parts by volume;
Water feed 240 parts by volume;
Temperature of washing approximately 130 to 150° F.

Other temperatures of washing could be employed, if so desired. The rate of feed is regulated to obtain satisfactory phase separation which, of course, is a function of the packing and of the size of the column at a given rate of feed and is readily determined by observing the output of the column to ascertain that additional phase separation does not occur if the solutions are left standing.

The naphtha was subsequently evaporated from the unsaponifiable material to obtain a yield of 2.2 parts by weight of unsaponifiable material per 40 parts of original paste or a yield of 5.5 per cent based upon the original paste of soap subjected to treatment.

The crude unsaponifiable matter rich in sterols was dissolved in methanol in a ratio of about 1 part sterol to 10 parts methanol and crystallized to yield 2.1 per cent of crude sterols based upon the tall oil soap concentrate. The sterols had a melting point of 118 to 120° C. Digitonin precipitation indicated a purity of 75.6 per cent. These sterols were further purified by decolorization with charcoal and crystallization from isopropanol to yield a fraction with a melting point of 119 to 122° C. Digitonin analysis indicated a sterol content of 82.1 per cent.

The mixture of soaps of rosin and fatty acids remaining in the water and alcohol from column I was subjected to evaporation to recover alcohol and naphtha which was returned to the process. The soaps were then acidified, washed and distilled at a pressure of about 1 mm. A light-yellow distillate suitable for use in the manufacture of alkyd resins, soaps and many other purposes was obtained. The pot residue in the still constituted only 7.8 per cent of the original paste solids. In contra-distinction in conventional procedure where tall oil is subjected to distillation in order to recover the acids thereof, the residue comprises 20 or 30 per cent of the tall oil.

The following additional examples illustrate the separation of the unsaponifiable matter from crude tall oil soaps of the type previously described employing varying ratios of tall oil in a water-isopropyl alcohol solution as a solvent. Separations were conducted at temperatures of 80 and 120° F. The extractions were conducted batchwise but the same principles are applicable to countercurrent extraction in an apparatus such as that disclosed in the drawing herein. In each instance the ratio of the immiscible or partly miscible solvent for unsaponifiable matter, e. g. naphtha of heptane grade was 1 to 1 with respect to the solution of crude tall oil soaps and unsaponifiable matter in water and alcohol.

*Example II*

A crude mixture of tall oil soaps containing unsaponifiable matter was made up in water and isopropyl alcohol in a concentration of 17.6 per cent. The alcohol was varied over a range of 19 to 37 per cent in the water-alcohol-soap mixture. Clean separations of the naphtha from the soap solution in water and isopropyl alcohol were obtained over the entire range. The naphtha solution of unsaponifiable matter could be washed with water to free it of soaps and certain other constituents. The resultant mixture of unsaponifiable matter could be crystallized to obtain the sterols in relatively pure form. The alcohol may be recovered from the soaps by distillation and the fatty acids and rosin acids regenerated by acidification of the mixture. The acids could readily be fractionated by distillation methods.

*Example III*

In this example the crude mixture of tall oil acid soaps and unsaponifiable matter was made up in water and isopropyl alcohol in a concentration of 24 per cent. The isopropyl alcohol content of the solution to be extracted was varied within a range of 19 to 28.4 per cent. Extractions were conducted at 80° F. and again at 120° F. and satisfactory separation of the naphtha solution of unsaponifiable matter from the water and isopropyl alcohol solutions of soaps of rosin acids and fatty acids were obtained. The desired components of the two phases could be recovered in the manner previously described.

*Example IV*

In this instance the crude mixture of tall oil acid soaps and unsaponifiable matter was made up to a concentration of 29.6 per cent in water and isopropyl alcohol. The isopropyl alcohol content of the soap mixture was varied over a range of 18 to 26 per cent. The extractions with naphtha were conducted at 80° F. and at 120° F. with good results.

Solutions of crude tall oil soaps when made up as herein described and extracted with a solvent for unsaponifiable matter countercurrently, are not subject to emulsification. Thorough and intimate contact of the alcoholic solutions with the solvent of unsaponifiable matter can be attained and quick and effective phase separation are still attained. Insofar as is known, these results have not heretofore been attained. With very high concentrations of both soap and isopropyl alcohol, the naphtha tends to become too miscible; therefore, with soap solutions of high concentration the isopropyl alcohol content should be reduced below the maximum attainable with solutions of low soap concentration.

In Figures 2 and 3 of the drawing are curves plotted upon triangular coordinates illustrating appropriate systems of water isopropyl alcohol and solids of saponified tall oil for countercurrent extraction with naphtha as illustrated in Figure 1 of the drawings. In the graphs, the sides A—C constitute the isopropyl-alcohol-tall oil solids axes. Sides A—B constitute the isopropyl-alcohol-water axes and sides B—C constitute the water-tall oil solids axes.

The graph in Figure 2 is based upon extractions conducted at 80° F. The percent of tall oil solids comprising alkali, e. g. sodium soaps of rosin acids and fatty acids and unsaponifiable matter as previously described, may be as low as 5 or 10% but usually for economies' sake it is maintained at a higher figure. The tall oil solids employed were a conventional tall oil product from southern pine produced by the West Virginia Pulp & Paper Company and sold under the trade name of "Tallso."

The limbs L and M are the approximate limits of operability of the system. The area on the graph between limbs L and M include the systems of saponified tall oil solids, water and alcohol which are susceptible of countercurrent extraction with naphtha. The portion of the area below the branch N embodies systems of the three components which at the temperature given are regarded as being especially suitable for solvent extraction with naphtha countercurrently to remove unsaponifiable matter from the soaps. In this area, the naphtha and the solution of soaps in water and isopropyl alcohol separate very rapidly and completely into layers which can be drawn off from each other for recovery of the tall oil solids.

Figure 3 is a similar graph illustrating operable systems for countercurrent extraction with naphtha of tall oil solids in solution of water and isopropyl alcohol at a temperature of 120° F. In this curve, the area embraced between the branches O and P approximately includes the practical systems of tall oil solids, water and isopropyl alcohol which are susceptible of countercurrent extraction with naphtha in a column as illustrated in Figure 1 to obtain separation of the soaps and the unsaponifiable matter. The area below the branch Q and between the latter branch and the branch P represent systems that are especially suitable for the application of the countercurrent technique because, in this area, the separation of the naphtha and the solution of tall oil solids in water and isopropyl alcohol is extremely rapid and complete and the separation of the unsaponifiable matter from the saponifiable matter is relatively sharp.

It will be understood that any system falling within the areas designated in Figures 2 and 3 is liquid at the temperature given, is but partially miscible with naphtha and does not form emulsions with the latter matter. The solutions can be introduced at the top of an extraction zone such as the zone or column I of Figure 1 and will flow countercurrently downwardly with relatively complete co-mingling and contact with upwardly flowing naphtha introduced at the bottom of the same zone. The naphtha solution of unsaponifiable matter containing small amounts of soaps of tall oil acids passes off from the clearing zone $b$ at the top of the column and can be readily washed with water to remove the soaps in the column II. Soap solutions in water and isopropyl alcohol are drawn off at the bottom from clearing zone $a$ and can be processed as previously described.

It has also been indicated that the principles of the invention may be applied to the use of mixtures of water and methanol or methyl alcohol as solvent media for tall oil solids in the countercurrent extraction of unsaponifiable matter of tall oil with naphtha. The following examples illustrate this technique.

*Example V*

In this example, a northern tall oil was employed. The composition included 60% solids of which 8.8% was unsaponifiable material. The rest was mainly sodium soaps of tall oil acids. The composition included 40.0% of water. The saponified tall oil solids were made into a solution comprising:

30% tall oil solids
20% methanol
50% water

The percentages as given are by weight. This solution was introduced into the inlet of the extraction column I. Naphtha, e. g. fraction approximately heptane or octane grade, and consisting of a mixture primarily of paraffinic hydrocarbons containing 6 to 10 carbon atoms was introduced at the bottom of the column but above the clearing zone $a$. The proportions were respectively 45 parts by volume of soap solution and 180 parts by volume of naphtha, or a ratio of 1 to 4. The temperature of the column was 120° F.

The soap constituents were drawn off at the lower clearing zone $a$ in solution in the water and methanol and were subjected to appropriate steps for recovery of the tall oil acids. For example, the solution was subjected to acidification with sulphuric acid or the like to precipitate a mixture of rosin acids and fatty acids that could be separated from the water-methanol layer and dried. About 19.3 parts by weight of tall oil (mainly acids) was recovered. Subsequently, if desired, the rosin acids could be separated from the fatty acids by appropriate technique. One convenient system would involve distillation, preferably under relatively high vacuum. The fatty acids could also be selectively esterified with a lower alcohol such as methyl alcohol or ethyl alcohol and separated by distillation or other appropriate technique.

The solution comprising primarily unsaponifiable matter, including sterols such as beta-sitosterol, higher alcohols (alcohols containing 22 carbon atoms or more per molecule) and other constituents, was taken off in the naphtha phase at the top of column I and washed with water to remove any residual soaps contained therein. The washing operation was performed in the manner prescribed, namely by passing the naphtha solution containing the unsaponifiable material to the bottom of column II and washing it with water in the latter column in countercurrent flow. Column II was maintained at 105° F. and the water feed was 100 parts by volume.

The naphtha solution of unsaponifiable matter from which residual soaps had been washed was drawn off from the clearing zone at the top of column II and the unsaponifiable material was recovered preferably by evaporating the solvent. The yield of unsaponifiable matter was 3.78 parts by weight. Sterols were further concentrated by crystallizing them from an appropriate solvent, such as a solution of ethyl alcohol and acetone. In this manner, 1.26 parts by weight of the crude sterols of tall oil from northern pine were readily recovered to provide a product melting within a range of 110 to 120° C. The sterols could have been further purified by appropriate technique, which it is not deemed to be necessary further to describe.

In similar manner, tall oil from southern pine was subjected to the treatment of this invention in order to separate a concentration of unsaponifiable matter and to obtain the soaps of the fatty acids and rosin acids relatively free of unsaponifiable matter. It is to be understood that the tall oil of northern pine in many instances is highly rich in unsaponifiable matter and may contain 8 or 9% or perhaps even more of this material. It would also appear that the unsaponifiable matter from northern pine is relatively low in the long chain alcohols, such as C-22 or higher alcohols, which are difficult to separate from tall oil sterols by conventional methods.

The following constitutes an example illustrating the application of the principles of the invention to the fractionation of the solid matter of southern pine tall oil.

*Example VI*

The crude skimmings of the tall oil from southern pine were processed. These skimmings include about 60% of solid matter, the rest being essentially water. The skimmings were diluted to a composition of 20% methanol, 50% water and 30% tall oil solids in which the tall oil acids were present as sodium soaps. The solid matter readily went into solution in the mixture of water and methanol to provide a solution which was readily susceptible of countercurrent extraction in the column I. To effect extraction of the solution, 45 parts by volume of the latter were introduced at inlet 3 of the column and 135 parts by volume of naphtha was passed in at inlet 4. The temperature of the system was 130° F.

The solution of soaps, rosin acids and fatty acids in water and methanol was drawn off from the clearing zone at the bottom of the column and the soaps were recovered. This could be accomplished by acidification of the soaps with sulphuric acid or the like to precipitate the free rosin acids and fatty acids. The acids were skimmed off and were then water washed to remove soluble impurities, such as sodium soaps and free acids. Residual solvents were evaporated from the tall oil acids. The product as recovered comprised 22.3 parts by weight of crude tall oil material.

Rosin acids and fatty acids in this mixture could be recovered in a highly concentrated form by distillation.

The naphtha solution of unsaponifiable material from the southern tall oil was drawn off at the top of column I from the upper clearing zone and was then subjected to washing with 90 parts by volume of water in column II at a temperature of 105° F. Washed unsaponifiable matter in naphtha was drawn off from the top of clearing zone of column II and 1.43 parts by weight of unsaponifiable matter was recovered by evaporation of the naphtha. It could be further purified, for example by crystallization by a solvent medium such as 6 parts ethyl alcohol and 4 of acetone at 0° C. At this temperature, a product comprising primarily the sterols of the tall oil having a melting point of 110 to 120° C. was recovered.

The formulation of systems of tall oil solid matter methanol and water suitable for countercurrent extraction with naphtha in the manner already described is illustrated in Figures 4 and 5 of the drawings. In these drawings, the various systems are graphed upon triangular coordinates in which the side B—C is the water-methanol axis, A—B is the methanol-tall oil soap solids axis at the side A—C is the tall oil soap solids-water axis. The area between the branches R and S of the curve in Fig. 4 and about the 10% soaps limit constitutes the zone in which liquid solutions of tall oil solids in water and methanol are obtained. These solutions can be extracted countercurrently with naphtha in the manner previously described into a naphtha phase containing the unsaponifiable material and a water-methanol phase containing most of the soaps of rosin acids and fatty acids. The unsaponifiable material in naphtha can be drawn off from the clearing zone at the top of column I and the water-methanol phase containing the soaps can be drawn off from the lower clearing zone. The recovery of the various constituents can be conducted in accordance with the technique previously described.

It will be understood that other temperatures than those specified for the systems covered by the curves in Figures 2, 3, 4 and 5 may be employed in column I. The temperature range may, for example, extend from room temperature or about 75° F. up to 160° F. and will include all of the intermediate temperatures.

Any solution falling between branches of the curve R—S in Figure 4, or T and U of Figure 5 will be operative at the lower temperature specified. At other temperatures, certain variations of the curves of course will take place. It is impossible to illustrate all of the possible systems since the number of different temperatures is practically unlimited. Most of the systems contemplated by the present invention where methyl alcohol is employed as the alcoholic medium will be embraced by the formula:

|  | Percent |
| --- | --- |
| Tall oil solids | 5 to 35 |
| Methanol | 12 to 65 |
| Water | 15 to 62 |

Of course, the operability of any particular system can be well determined by means of sample solutions which can be shaken up in bottled or other appropriate container with naphtha and left to stand for a short period of time. Operable solutions of soap and methyl alcohol must be liquid at the temperatures of extraction, must be at least but partially miscible with naphtha, must not form emulsions and must separate into phases when shaken, within a period of not more than 6 minutes. Solutions that do not separate from naphtha within this period of time are unsuitable for counter-current extraction with naphtha in the manner above described. The better mixtures will separate usually within a period of 3 minutes or less. As already indicated, ethyl alcohol may also be substituted for isopropyl alcohol or methyl alcohol as the alcoholic component of the solvent of the soap mixture. Where ethyl alcohol is so employed, the solids content of the mixture will be within a range of 5 to 35% by weight. The alcohol will constitute 15 to 70% of the mixture.

The forms of the invention herein described are to be considered as being merely by way of example. It will be apparent to those skilled in the art that numerous modifications may be made therein without departure from the spirit of the invention or the scope of the appended claims.

This application is a continuation-in-part of our copending application Serial No. 704,314, filed October 19, 1946, now abandoned, and entitled Fractionation of Tall Oil.

We claim:

1. A process of obtaining the unsaponifiable matter of tall oil in concentrated form, which process comprises making up a solution of the tall oil soaps containing the unsaponifiable matter of tall oil from the manufacture of paper pulp in a concentration of about 5 to 25 per cent in isopropyl alcohol and water with the final solution containing from 15 to 50 per cent of isopropyl alcohol and the remainder water, and extracting out the unsaponifiable matter in said solution by countercurrently flowing the solution in contact with naphtha in a ratio of 1 to 20 parts by volume per part of tall oil soap solution at a temperature of 80 to 130° F., by continuously introducing the solution into an upper portion of an extraction zone and continuously introducing naphtha into a lower portion of the same zone, drawing off the solution of isopropyl alcohol and water at the lower end of the zone at a point below that of introduction of the naphtha and drawing off the solution of unsaponifiable matter in naphtha at the other end of the system at a point above that of introduction of the solution and evaporating the naphtha from the solution of unsaponifiable matter.

2. A process of obtaining the unsaponifiable matter of tall oil in concentrated form, which process comprises making up a solution of the tall oil from the manufacture of paper pulp, in a concentration of 5 to 25 per cent in isopropyl alcohol and water with the final solution containing from 15 to 50 per cent of isopropyl alcohol and the remainder water and extracting out the unsaponifiable matter in said solution by countercurrently flowing the solution in contact with 5 to 10 parts by volume of naphtha per part of tall oil soap solution at a temperature of 80 to 130° F., by introducing the solution into an upper portion of an extraction zone and naphtha into a lower portion of the zone, removing a naphtha solution of unsaponifiable matter at the upper end of the system at a point above that of introduction of the solution of the soaps at the other end of the system at a point below that of introduction of the naphtha, washing the naphtha solution of unsaponifiable matter with water to remove residual unsaponifiable matter and evaporating off the naphtha.

3. In a process of obtaining the unsaponifiable matter of whole tall oil in concentrated form, the steps which comprise making up a solution of whole tall oil solids comprising rosin acid soaps and fatty acid soaps of tall oil along with the unsaponifiable matter of tall oil in solution in water and a lower alcohol of a class consisting of methanol, ethanol and isopropanol, the concentration of solids being 5 to 35%, the percentage of the alcohol for methanol being in a range of 12–65%, for ethanol being in a range of 15–70% for isopropyl being in a range of 15–50%; then extracting the unsaponifiable matter from the solution by flowing the solution continuously into an elongated extraction zone slightly below the top thereof and introducing naphtha continuously to a lower portion of the same zone slightly above the bottom thereof, the zone being maintained within a range of 75° F. to 150° F., allowing the solution and naphtha to percolate countercurrently through each other in intimate contact, drawing off a solution of tall oil acid soaps in water and the alcohol at the bottom of the zone below the point of inlet of naphtha and then drawing the solution of unsaponifiable matter in water at the top of the zone between the inlet from the solution of originals in solids from the water and alcohol and recovering the solvents from the resulting solution.

4. In a process of obtaining the unsaponifiable matter of whole tall oil in concentrated form, the steps which comprise making up a solution of 5 to 35% by weight of whole tall oil solids comprising rosin acid soaps and fatty acid soaps of tall oil and the unsaponifiable matter of tall oil in 15 to 62% by weight of water and 12 to 65% by weight of methanol, then extracting the unsaponifiable matter from the solution by flowing the latter continuously into an elongated extraction zone slightly below the top thereof and introducing naphtha continuously to the lower portion of the same zone, slightly above the bottom thereof, the zone being maintained within a range of 75° F. to 150° F., allowing the solution and naphtha to percolate countercurrently through each other in intimate contact, drawing off a solution of tall oil acid soaps in water and methanol at the bottom of the zone below the point of inlet of naphtha and drawing off a solution of unsaponifiable matter and naphtha at the top of the zone and recovering the solvents from the resulting solutions.

5. In a process of obtaining the unsaponifiable matter of whole tall oil in concentrated form, the steps which comprise dissolving 5 to 35% by weight of whole tall oil solids comprising rosin acid soaps and fatty acid soaps of tall oil and the unsaponifiable matter of tall oil in a mixture of water and a lower alcohol of the class consisting of methanol, ethanol and isopropanol, the percentage of the alcohol in the case of ethanol being in a range of 15 to 70% by weight, in the case of isopropanol being in a range of 15 to 50% by weight and in the case of methanol being in a range of 12 to 65% by weight, then extracting the unsaponifiable matter from the solution by flowing the solution continuously into an elongated extraction zone at a point slightly spaced from the first extremity thereof and introducing a solvent of unsaponifiable matter of a class consisting of diethyl ether, methyl ether, methyl ethyl ether, isopropyl ether, ethyl isopropyl mixed ether, methyl isopropyl mixed ether, benzene, toluene, xylene, naphtha and ethylene dichloride in a proportion of 1 volume to 20 volumes per volume of soap solution, the solvent being introduced continuously into a portion of the extraction zone slightly spaced from the second extremity thereof, the zone being maintained within a range of 75° F. to 150° F., allowing the solution and solvent to percolate countercurrently through each other in intimate contact, drawing off a solution of tall oil acid soaps in water and the alcohol at the second mentioned extremity of the zone, then drawing off the solution of unsaponifiable matter in the solvent thereof at the first mentioned extremity of the zone and recovering the solvents from the resultant solutions.

6. In a process of obtaining the unsaponifiable matter of whole tall oil in concentrated form, the steps which comprise dissolving whole tall oil solids comprising rosin acid soaps and fatty acid soaps of tall oil and the unsaponifiable matter of tall oil in a mixture of water and a lower alkyl monohydric alcohol containing from 1 to 3 carbon atoms per molecule to form a solution which comprises 5 to 35% of said solids, 15 to 50% said lower alcohol and the rest of the composition being water, then extracting the unsaponifiable matter from the solution by flowing the solution continuously into an elongated extraction zone at a point slightly spaced from the first extremity thereof and introducing a solvent of unsaponifiable matter of a class consisting of diethyl ether, methyl ethyl ether, isopropyl ether, ethyl isopropyl mixed ether, methyl isopropyl mixed ether, naphtha, benzene, toluene, xylene and ethylene dichloride in a proportion of 1 volume to 20 volumes per volume of soap solution, the solvent being introduced continuously into a portion of the extraction zone slightly spaced from the second extremity thereof, the zone being maintained at a temperature within a range of 75° F. to 150° F., allowing the solution and the solvent to percolate countercurrently through each other in intimate contact, drawing off a solution of tall oil acid soaps in water and the lower alcohol at the second extremity of the zone, then drawing off the solution of unsaponifiable matter in the solvent thereof at the first mentioned extremity of the zone and recovering the solvents from the resultant solutions.

ROGER M. CHRISTENSON.
STEWART W. GLOYER.

REFERENCES CITED

The following references are of record in the file of this patent:

UNITED STATES PATENTS

| Number | Name | Date |
|---|---|---|
| 2,218,971 | Julian et al. | Oct. 22, 1940 |
| 2,248,346 | Gayer et al. | July 8, 1941 |
| 2,273,045 | Julian et al. | Feb. 17, 1942 |
| 2,275,075 | Gayer et al. | Mar. 3, 1942 |
| 2,280,815 | Fernholz | Apr. 28, 1942 |

OTHER REFERENCES

Book of Standards, A. S. T. M., 1944, part III. p. 2097.